May 18, 1926.
J. L. COLE ET AL
1,585,532
ADJUSTABLE BOLT
Filed Nov. 12, 1924
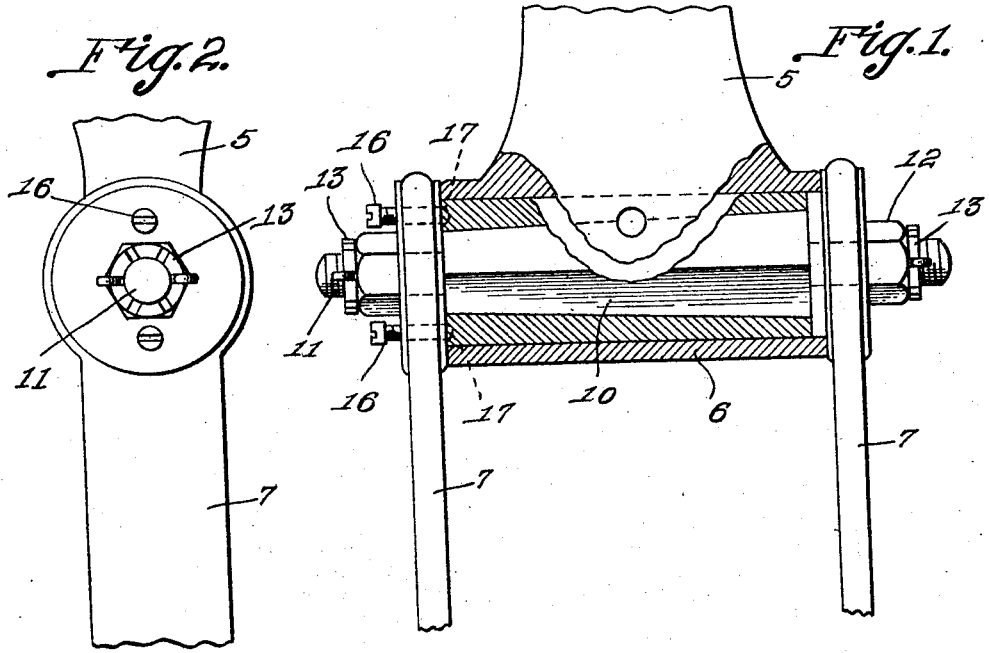
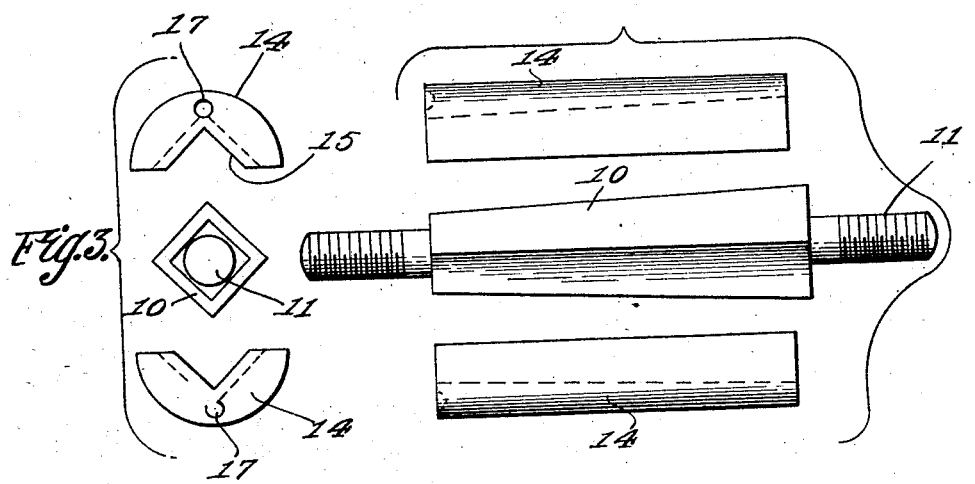
J. L. Cole
D. R. Gump
INVENTOR
BY Victor J. Evans
ATTORNEY
WITNESS:

Patented May 18, 1926.

1,585,532

UNITED STATES PATENT OFFICE.

JACOB L. COLE AND DENZEL R. GUMP, OF BRAVE, PENNSYLVANIA.

ADJUSTABLE BOLT.

Application filed November 12, 1924. Serial No. 749,508.

Our invention relates to adjustable bolts whereby tie rods, spring hangers or other machine elements may be connected together, and its principal object is to provide a bolt which can be readily adjusted to take up wear between the connected parts.

A further object of the invention is to provide a wear compensating bolt which can be readily and quickly adjusted and used in connection with various kinds of machine elements.

With the preceding and other objects and advantages in mind, the invention consists in the novel combination and arrangement of elements, constructions and arrangements of parts and operations to be hereinafter specifically referred to, claimed and illustrated in the accompanying drawings, wherein:

Figure 1 is a view partly in elevation and partly in section of an adjustable bolt constructed in accordance with my invention.

Figure 2 is a fragmentary side elevation of the same.

Figure 3 is a detail view of the several units embodied in the invention, and

Figure 4 is an end elevation taken at right angles to Figure 3.

Referring to the drawings in detail, wherein corresponding characters of reference denote corresponding parts throughout the several views, the numeral 5 designates a machine part provided with a sleeve or bushing 6 while 7 shows a pair of parallel arms operatively associated with the bushing or sleeve 6.

The above parts form no part of the present invention but are merely illustrative of the application of the invention.

Our invention comprises a four sided tapered bolt 10 which passes longitudinally through the sleeve 6 and has reduced threaded ends 11 upon which the parts 7 are received. Nuts 12 are threaded upon the ends 11 and are retained in locked position by means of lock washers 13, Embracing the bolt 10 is a pair of tapered semi-cylindrical shim sections 14 whose inner faces are provided with V-shaped in cross section recesses 15 to embrace the flat sides of the bolt 10.

As shown these shims are tapered to the taper of the bolt 10 and as the bore of the sleeve 6 wears these shims are adjusted longitudinally by means of adjusting screws 16 threaded through one of the members 7 and have their ends engaged in recesses 17 in the end of these shims.

From the disclosure it will be apparent that we have provided a simple and inexpensive adjustable bolt which can be readily used in connecting various kinds of machine elements and when wear between the parts occurs, it can be compensated for by adjusting the shims as above stated.

While we have shown and described the preferred embodiment of the invention, we desire to have it understood that we do not limit ourselves to what is herein shown and described, as such changes may be made in the form, construction and arrangement of parts as will not depart from the spirit of the invention or the scope of the subjoined claim.

What is claimed is:—

A device of the character described comprising a machine part having a sleeve, a four sided bolt passing through the sleeve, threaded extensions formed on the four sided bolt, nuts arranged on the threaded extensions and holding machine elements in place, a plurality of shims embracing the four sided bolt and formed with recesses to conform with the sides of the bolt, the shims being tapered longitudinally and adjusting screws on one of the machine elements and engaging the adjacent ends of the shims whereby to adjust the same longitudinally.

In testimony whereof we affix our signatures.

JACOB L. COLE.
DENZEL R. GUMP.